United States Patent [19]
Uchida et al.

[11] Patent Number: 5,946,437
[45] Date of Patent: Aug. 31, 1999

[54] OPTICAL FIBER CONNECTOR

[75] Inventors: Takahiro Uchida; Keiichiro Akasawa, both of Noda, Japan

[73] Assignee: Miyachi Technos Corporation, Noda, Japan

[21] Appl. No.: 08/507,723

[22] Filed: Jul. 26, 1995

[30] Foreign Application Priority Data

Jul. 27, 1994 [JP] Japan .................................. 6-175797

[51] Int. Cl.$^6$ ...................................................... G02B 6/36
[52] U.S. Cl. ................................ 385/77; 385/76; 385/78; 385/139; 385/140
[58] Field of Search .................................. 385/38, 53, 76, 385/77, 78, 84, 70, 72, 139, 140

[56] References Cited

U.S. PATENT DOCUMENTS

| | | | |
|---|---|---|---|
| 4,737,011 | 4/1988 | Iri et al. | 385/78 X |
| 5,013,110 | 5/1991 | Marazzi | 385/77 X |
| 5,291,570 | 3/1994 | Filgas et al. | 385/78 |
| 5,446,818 | 8/1995 | Baker et al. | 385/78 |
| 5,594,825 | 1/1997 | Kawasaki et al. | 385/60 |

*Primary Examiner*—Brian Healy
*Attorney, Agent, or Firm*—Charles N. Quinn

[57] ABSTRACT

An optical fiber connector having a heat resisting spacer sleeve covering the exposed end portion without covering member of optical fiber. The outer end surface of said spacer sleeve is inclined with respect to axial direction of the optical fiber, the inclined end surface being made so as to diffuse any high-power laser beam portion diverted from the end surface of optical fiber and reaching on said end surface. At least outer end surface of the spacer sleeve and its inner surface opposed to the optical fiber are made such as to diffuse high-power laser beam. The optical fiber and inner surface of the spacer sleeve opposed thereto are opposed directly to each other without any intermediate substance therebetween.

4 Claims, 3 Drawing Sheets

OPTICAL FIBER CONNECTOR

FIELD OF THE INVENTION

This present invention relates to optical fiber connector, and in particular to an optical fiber connector which is suitable for the end portion of optical fiber used for transmission of high-power laser beam.

BACKGROUND OF THE INVENTION

In general, for the purpose of carrying out cutting, soldering and welding of workpieces by means of high-power laser beam, high-power laser beam emitted from laser oscillator is injected into optical fiber 2 through input-side lens unit 1 to be transmitted to working side as shown in FIG. 1, and said laser beam is irradiated, through said optical fiber 2, from output-side lens unit 3 onto work 4 thereby to carry out a predetermined working thereon. The construction is such that said high-power laser beam from said input-side lens unit 1 is focused on the end surface of said optical fiber 2, while reflected laser beam from said work 4 is, through said output-side lens unit 3, focused onto the other end surface of said optical fiber 2.

There has been a problem however that though high-power laser beam is to focus on the end surface of optical fiber 2, it may focus on other portion than said end surface, for example on adhesives, which adhesives may be heated by high-power laser beam and burned out.

For eliminating such difficulties, a proposal concerning the end portion of optical fiber has been proposed for example by Japanese Utility Model Publication No.91-17284.

More specifically, as shown in FIG. 2 showing the prior art end portion of optical fiber, the end portion of optical fiber 2 formed by central core and outer clad is covered on its outer side by a spacer sleeve 5 of heat resisting material, which spacer sleeve 5 is further covered by a heat-resisting protective sleeve 6. End surface 5a of said spacer sleeve 5 is located inside at a predetermined distance from the end surfaces of optical fiber 2 and said protective sleeve 6, thereby to form a space where there is no substances apt to be burned by high-power laser beam, in order to prevent any burning damage due to laser beam even when it focuses at any place other than said end surface of optical fiber 2.

However, since said heat-resisting spacer sleeve 5 is formed from transparent body or translucent body, the portion of high-power laser beam which is not filled in optical fiber 2 caused by erroneous injection thereinto or by reflected laser beam from the surface of work 4 penetrates into said spacer sleeve 5, with disastrous results of burning of said protective sleeve 6 and even optical fiber 2 itself. Further, since the end surface 5a of said spacer sleeve 5 is a crosscutting surface which is perpendicular to axial direction of optical fiber 2, i.e. substantially to the direction of high-power laser beam, high-powerlaser beam portion which was diverted from the end surface of optical fiber 2 and which reached said end surface 5a gains a higher level of energy density thereby to burn out said spacer sleeve 5 itself.

SUMMARY OF THE INVENTION

For eliminating the above-described disadvantages, the present invention has as its object an optical fiber connector which can prevent the elements constituting the optical fiber connector from being heated or burned even when high-power laser beam is injected onto any place other than the end surface of optical fiber.

For achieving the above-mentioned object, the present invention delivers an optical fiber connector having a heat resisting spacer sleeve covering the stripped portion of optical fiber, said optical fiber is characterized according to the invention in that the outer end surface of said spacer sleeve is inclined with respect to axial direction of said optical fiber, said inclined end surface being formed so as to diffuse any high-power laser beam portion diverted from the end surface of optical fiber and reaching thereon.

Further, optical fiber connector according to the invention is characterized in that at least outer end surface of said spacer sleeve and its inner surface opposed to said optical fiber are formed such as to diffuse high-power laser beam.

Further, optical fiber connector according to the invention is characterized in that said optical fiber and inner surface of said spacer sleeve opposed thereto are opposed directly to each other without any intermediate substance.

When using optical fiber connector according to the invention, the portion of high-power laser beam diverted from the end surface of optical fiber reaches the outer end surface of spacer sleeve and its inner surface opposed to optical fiber. However, since the outer end surface of said spacer sleeve is a surface inclined to said axis of said optical fiber, i.e. to light beam axis of high-power laser beam, said portion of high-power laser beam is prevented from focusing on said outer end surface, thereby to prevent any increase of energy density. Further, due to diffusion of said portion of high-power laser beam reaching the surface of said spacer sleeve (including the end surface thereof and the internal surface thereof opposed to said optical fiber) can be diffused by said surface, thereby preventing any heating and burning damages of elements constituting the optical fiber connector.

Further due to the fact that said optical fiber and inner surface of said spacer sleeve opposed thereto are opposed directly to each other without any intermediate substance, elements which are apt to be burned by high-power laser beam are eliminated, thus decreasing the possibility of burning damage.

Since the optical fiber connector according to the invention has the construction and functions as described above, constituting elements thereof are prevented from being heated and burnt even when a portion of high-power laser beam is injected onto any place other than said end surface of optical fiber, with beneficial effects such as higher safety and longer service life.

DETAILED DESCRIPTION OF THE EMBODIMENTS

Figure 1:
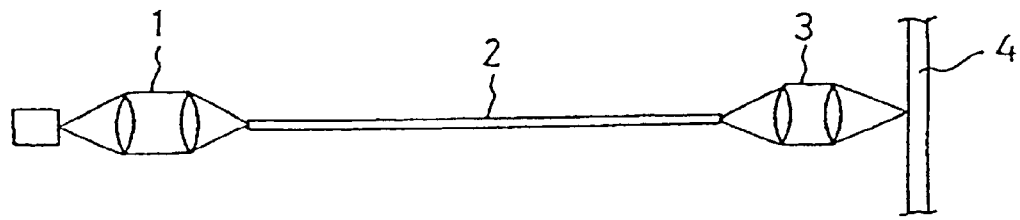
FIG. 1 is a schematic view of heretofore known optical fiber connector.
Figure 2:
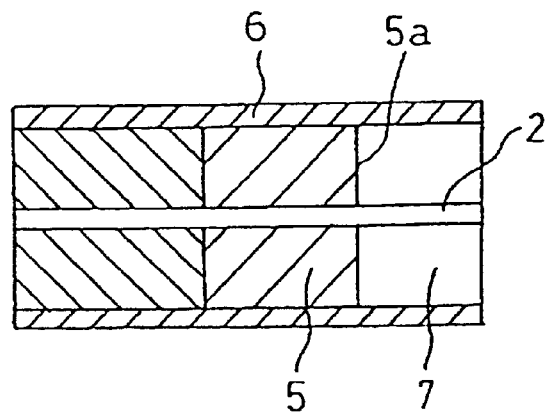
FIG. 2 is an enlarged cross-sectional view of the connector portion of heretofore known optical fiber connector.
Figure 3:
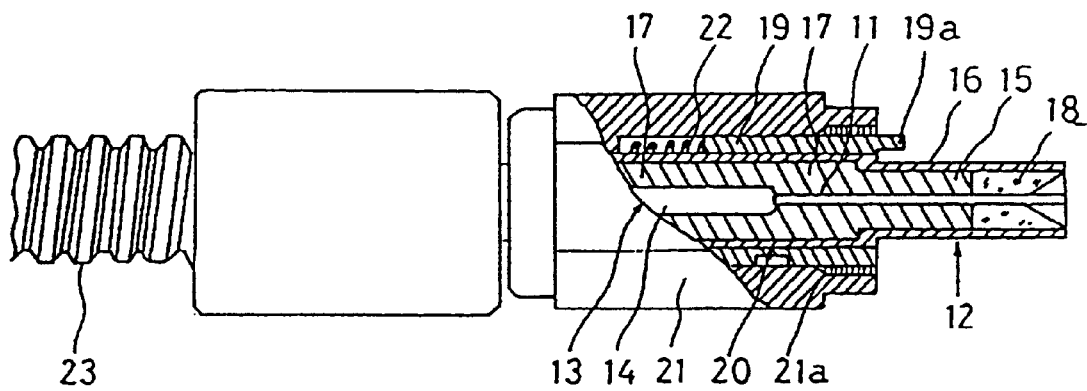
FIG. 3 is a cross-sectional view of optical fiber having one embodiment of connector according to the invention.
Figure 4:
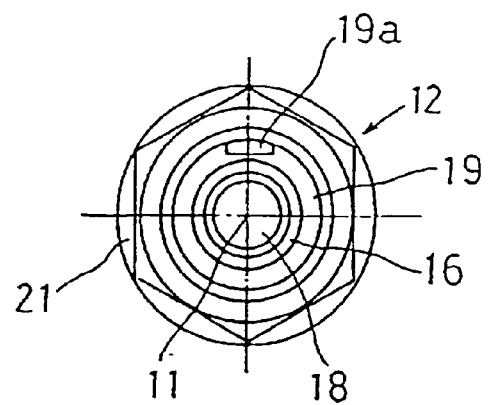
FIG. 4 is a right-hand end view of FIG. 3.
Figure 5:
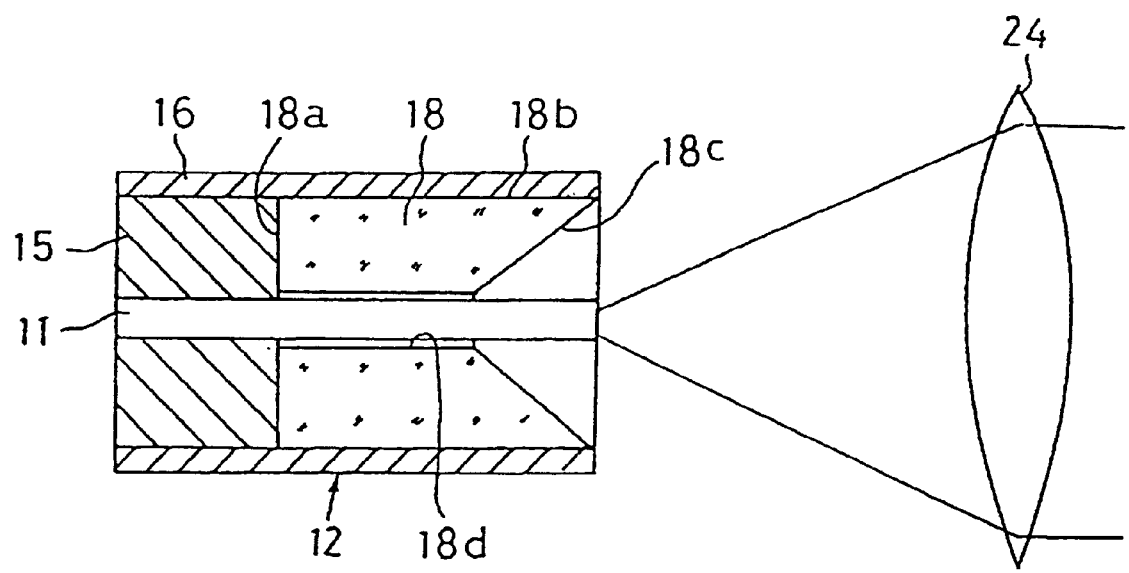
FIG. 5 is an enlarged view of the optical fiber connector shown in FIG. 3.

Embodiments of the present invention are now described more in detail with reference to FIG. 3 through FIG. 8, in which FIG. 3 through FIG. 5 show one embodiment of the present invention.

In FIG. 3, the optical fiber connector 12 is mounted on the end portion of an optical fiber 11 placed at the center axis position of an optical fiber cable. Said optical fiber 11 comprising a central core and outer clad is covered by outer covering member 14 to form an optical fiber cable 13. In the area of said connector 12, said optical fiber cable 13 is covered on its outer side by a fiber guide 15, while the portion of said covering member 14 corresponding to the end portion of said connector 12 is removed to expose said optical fiber 11. The outer side of said fiber guide 15 is covered by a protective sleeve 16 of metal tube. Said optical fiber cable 13 comprising exposed portion of optical fiber 11 and said outer covering member 14 are coaxially bonded to said fiber guide 15 by means of adhesives, while on the other hand said fiber guide 15 and said protective sleeve 16 are also coaxially laser welded to each other at plural weld points 17, 17 positioned circumferentially with equal distances and in axial direction.

As shown in FIG. 3 and FIG. 5, a ring-shaped spacer sleeve 18 of heat resisting materials forming the optical fiber connector 12 according to the invention is inserted between the end portion of optical fiber 11 deprived of covering material 14 and that of protective sleeve 16. The internal end surface 18a of said spacer sleeve 18 is in close contact with outer end surface of fiber guide 15, while the outer surface 18b of said spacer sleeve 18 is bonded to the inner surface of said protective sleeve 16 by means of adhesives. The outer end surface 18c of said spacer sleeve 18 comprises an inclined surface to center axis of said optical fiber 11 which forms a funnel widening outwards. Said spacer sleeve 18 used according to the invention is formed from opaque materials, zirconia, alumina or mica ceramics such as "Macerite" (Mitsui Kozan Material Co., Ltd.'s trade name). Said outer end surface 18c and the inner surface 18d opposed to said optical fiber 11 are made rough surfaces with minute unevenness obtained by for example by sand blasting or chemical etching. Further, since tolerance of outer diameter of said optical fiber 11 is in the order of ±5%, a minute gap is formed between outer surface of optical fiber 11 and inner surface of spacer sleeve 18. Thus formed gap is not filled according this embodiment, with said surfaces opposing directly to each other. The outer surface of end portion of said protective sleeve 16 is finished with a high accuracy for obtaining a faucet joint to a not-shown lens unit. A metallic engaging tube 19 is attached on the outer surface of said protective sleeve 16 by means of laser welding 20, said engaging tube 19 having an engaging projection 19a for connection to lens unit without relative rotation therebetween. A securing tube 21 is mounted shiftably in axial direction and rotatably on the outer side of said protective sleeve 16 and said engaging tube 19, with said securing tube 21 having a female screw portion 21a which is to be screwed into a not-shown securing tube of said lens unit. A compression spring 22 is inserted between inner end of said engaging tube 19 and said securing tube 21. The other end of said optical fiber 11 is also formed as shown in FIGS. 3 to 5, and the portion of said optical fiber cable 13 between these ends is covered on its outer surface by means of a metallic flexible pipe 23 such as stainless steel tube for security purpose.

The apparatus according to the above embodiment operates as follows:

When an optical fiber 11 is connected to said lens unit by means of said securing tube 21 of optical fiber connector 12 according to this embodiment, lens 24 and said connector 12 are located at predetermined opposing positions as shown in FIG. 5.

In this relative position of lens and connector, high-power laser beam is focused through lens 24 onto the end surface of optical fiber 11. Any portion of said high-power laser beam which deviated from said end surface of optical fiber 11 may reach said outer end surface 18c of said spacer sleeve 18 and said inner surface 18d thereof opposed to said optical fiber 11. However, since said outer end surface 18c is inclined to the axis of optical fiber 11, i.e. the beam axis of high-power laser beam, no focusing is caused on said end surface 18c, thereby to prevent increase of energy thereon. Further, said deviated portion of high-power laser beam is reflected and diffused by the minute rough surface of said end surfaces 18c, 18d, thereby to be prevented from focusing anywhere. Thus, heating and burning of any members of optical fiber connector 12 are perfectly eliminated.

Further, since outer surface of optical fiber 11 and the inner surface 18d of said spacer sleeve 18 are opposed directly to each other without any intermediate member thus forming a minute gap therebetween, the possibility of burning damage by high-power laser beam is very low. In the case where there is no risk of high-power laser beam portion penetrating into said gap, this gap can be filled with adhesives thereby to secure directly said optical fiber 11 and said spacer sleeve 18 to each other.

In the above embodiment, said spacer sleeve 18 is formed from opaque materials such as ceramics, but it can be of transparent materials such as quartz glass having lower refractive index than that of clad or ordinary glass. In this case, high-power laser beam penetrates into the transparent spacer sleeve 18 through said outer end surface 18c and inner surface 18d thereof. Said penetrating portions of laser beam can not focus anywhere because these laser beam portions are diffused when injected through outer end surface 18c and inner surface 18d having minute rough surfaces and when ejected through these surfaces after reflecting on inner end surface 18a and outer surface 18b of spacer sleeve 18. Further, if said inner end surface 18a and said outer surface 18b are made diffusing surfaces having minute roughness, the portion of high-power laser beam reflected by these diffusing surfaces 18a, 18b and ejected through the also diffusing surfaces 18c, 18d can not focus with additional reasons.

Figure 6:
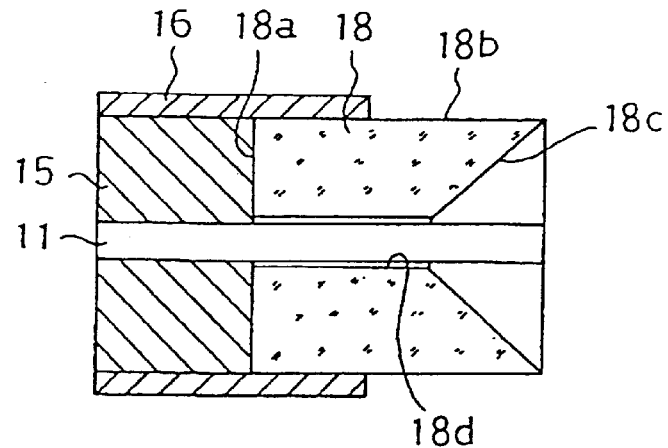
FIG. 6 is an enlarged view similar to FIG. 5 of another embodiment of the optical fiber connector according to the invention.
Figure 7:
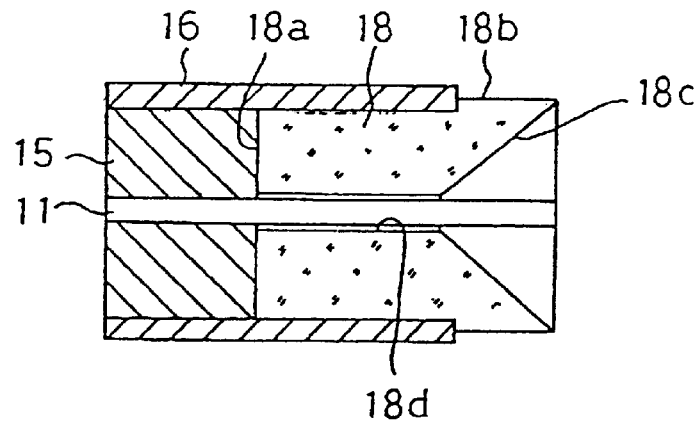
FIG. 7 is an enlarged view similar to FIG. 5 of a further embodiment of the optical fiber connector according to the invention.
Figure 8:
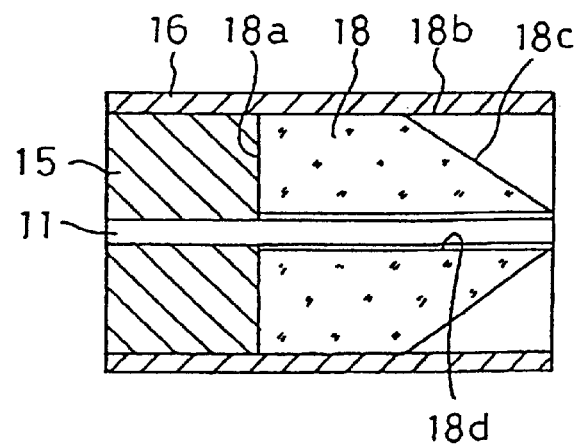
FIG. 8 is an enlarged view similar to FIG. 5 of still another embodiment of the optical fiber connector according to the invention.

The relative position of said spacer sleeve 18 and said protective sleeve 16 can be altered depending upon the connecting structure with lens unit, as shown in FIG. 6 and FIG. 7.

Finally, the outer end surface 18c of spacer sleeve 18 may be a surface tapering outwards contrary to the end surface in the above embodiments, or a convex or concave curved surface.

While the present invention has been described with reference to exemplary embodiments thereof, it will be appreciated by those-skilled in the art that variations and modifications may be made thereto without departing from the spirit of the inventive concepts disclosed herein. All such variations and modifications are intended to fall within the scope of the claims appended thereto.

What is claimed is:

1. An optical fiber connector having a heat resisting spacer sleeve formed from opaque material covering the exposed end portion of optical fiber with covering member removed, characterized in that:

the outer end surface of said spacer sleeve is inclined with respect to axial direction of said optical fiber to form a concave surface outwardly, at least said inclined outer end surface of said spacer sleeve and its inner surface opposed to said optical fiber are matt-finished such as to diffuse high-power laser beam diverted from the end surface of optical fiber and reaching on said surface; and and optical fiber and inner surface of said spacer sleeve opposed thereto are opposed directly to each other without any intermediate substance.

2. The optical fiber connector of claim 1 wherein said opaque material is zirconia, alumina or mica ceramics.

3. An optical fiber connector having a heat resisting spacer sleeve formed from transparent or translucent material covering the exposed end portion of optical fiber with covering member removed, characterized in that:

the outer end surface of said spacer sleeve is inclined with respect to axial direction of said optical fiber to form a concave surface outwardly, at least said inclined outer end surface of said spacer sleeve and its inner surface opposed to said optical fiber are matt-finished such as to diffuse high-power laser beam diverted from the end surface of optical fiber and reaching on said surface; and said optical fiber and inner surface of said spacer sleeve opposed thereto are opposed directly to each other without any intermediate substance.

4. The optical fiber connector of claim 3 wherein said transparent or translucent material is quartz glass having lower refractive index than that of said optical fiber clad or ordinary glass.

\* \* \* \* \*